United States Patent [19]

Frankinet et al.

[11] Patent Number: 4,946,944

[45] Date of Patent: Aug. 7, 1990

[54] PROCESS FOR THE SELECTIVE EXTRACTION OF METALLOPROTEINS FROM WHEY BY ADSORPTION AND ELUTION

[75] Inventors: Jacques Frankinet, Vannes; Andreé Peyrouset, Orsay; Francois Spring, Pyrénées Atlantiques, both of France

[73] Assignees: ENTREMONT S.A.; NATIONALE ELF AQUITAINE, both of France

[21] Appl. No.: 396,821

[22] Filed: Aug. 21, 1989

Related U.S. Application Data

[63] Continuation of Ser. No. 205,828, Jun. 13, 1988, abandoned.

[30] Foreign Application Priority Data

Jun. 19, 1987 [FR] France ............................ 87 08843

[51] Int. Cl.$^5$ ..................... A23J 1/20; A61K 37/14
[52] U.S. Cl. .................................... 530/400; 426/658; 435/192; 424/88; 530/362; 530/364; 530/366; 530/415; 530/417; 530/833
[58] Field of Search ............... 530/362, 364, 366, 415, 530/417, 833, 400; 435/192; 424/88

[56] References Cited

U.S. PATENT DOCUMENTS

| | | | |
|---|---|---|---|
| 4,100,149 | 7/1978 | Meiller et al. ..................... | 530/362 |
| 4,229,342 | 10/1980 | Mirabel ........................... | 530/366 X |
| 4,308,254 | 12/1981 | Tayot et al. ....................... | 424/88 X |
| 4,436,658 | 3/1984 | Peyrouset et al. ............... | 530/366 X |
| 4,667,018 | 5/1987 | Prieels et al. ..................... | 530/417 |
| 4,673,734 | 6/1987 | Tayot et al. ...................... | 530/417 X |

FOREIGN PATENT DOCUMENTS 2638764 8/1976 Fed. Rep. of Germany .
2319399 7/1976 France .
2443867 12/1978 France .

OTHER PUBLICATIONS

ANNALES de la NUTRITION et de L'ALIMENTATION, vol. 32, No. 2-3, 1978, pp. 243 253, Paris FR; B. MIRABEL: "Nouveau procede d'extraction des proteines du lactoserum".

Journal of Dairy Science, vol. 54, No. 12, Dec. 1971, pp. 1725-1743; Y. Makoto et al.: "Chromatographic Separation of Milk Proteins: A Review".

Primary Examiner—Howard E. Schain
Attorney, Agent, or Firm—Arnold, White & Durkee

[57] ABSTRACT

Process for the selective extraction of metalloproteins from whey, by adsorption on a porous inorganic support in the form of particles, followed by elution of the metalloproteins thus absorbed by means of solutions, characterized in that the walls of the said particles are coated with a layer of aminated polysaccharides possessing acidic functional groups at the surface.

6 Claims, 1 Drawing Sheet

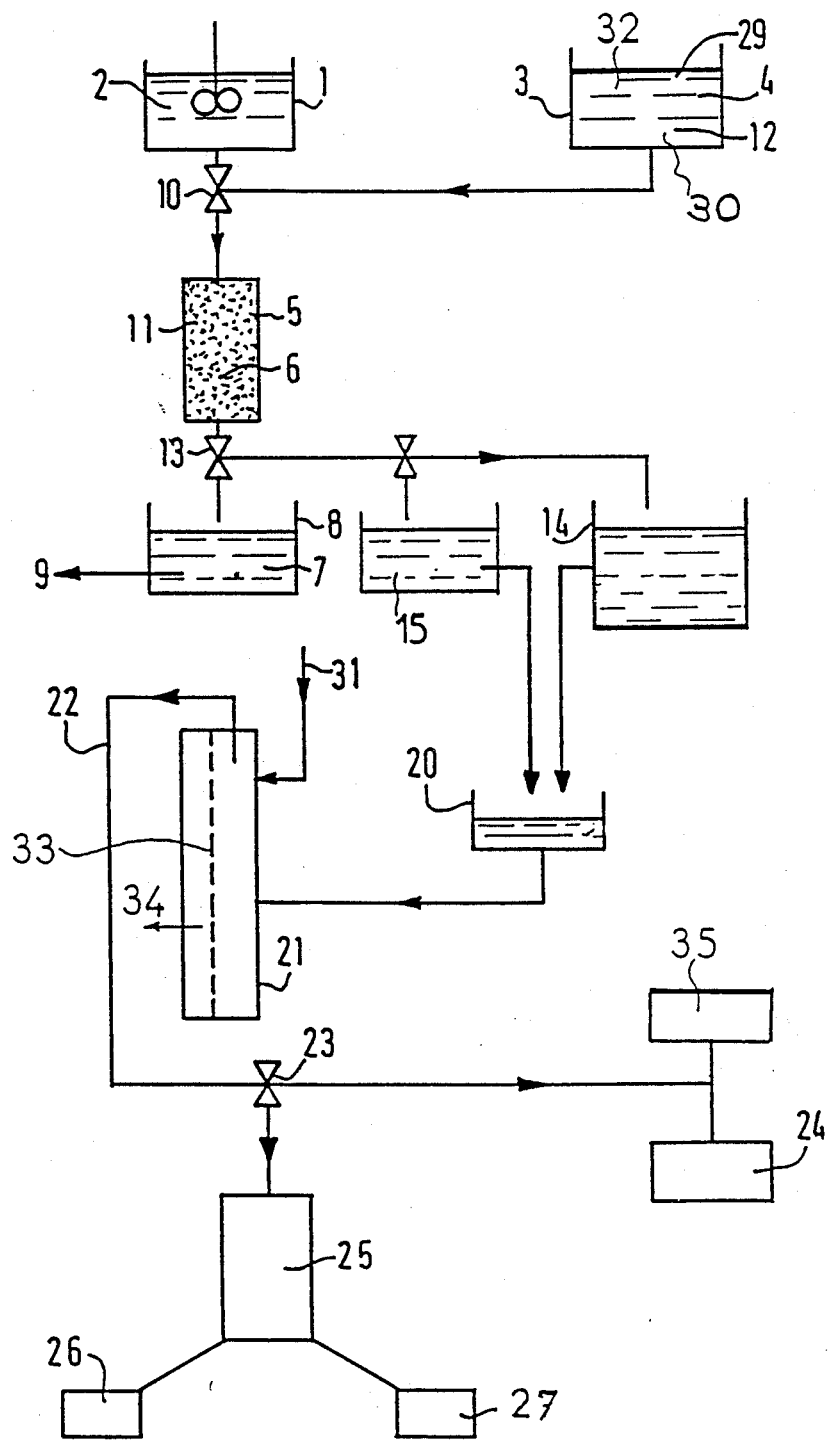

PROCESS FOR THE SELECTIVE EXTRACTION OF METALLOPROTEINS FROM WHEY BY ADSORPTION AND ELUTION

This is a continuation of application Ser. No. 07/205.828 filed June 13, 1988.

The invention relates to a process for the selective extraction of certain proteins from whey, namely metalloproteins, in particular those which bind iron such as lactoferrin, transferrin and lactoperoxidase.

Several thousand proteins are known to exist. Whey contains hundreds of them, including a few traces of metalloproteins.

"Metalloproteins" is understood to denote proteins which show appreciable affinity for metals, in particular, for iron. These proteins are in increasing demand, not only on account of their nutritional value, in particular for providing a biological supply of iron in infants (in the case of lactoferrin), but also on account of their pharmacological properties, in particular as antibacterial agents.

Several processes are already known for the extraction of proteins from whey.

In the document GB-A-871,541, it has been proposed to extract proteins in general by bringing the whey into contact with an ion exchange resin consisting of an inert base (diatomaceous earths), having a large specific surface area, coated with an exchanger gel (styrene/divinylbenzene copolymer). This old technique enables the proteins to be extracted en masse, unselectively.

In the document FR-A-2,505,615 (known corresponding document US-A-4,436,658), it has been proposed to recover the desired metalloproteins, namely lactoferrin and lactoperoxidase, selectively by percolating the whey in the first place through a rigid solid support such as, in particular, silica, in a weakly basic medium (pH from 7.9 to 8.5), and then eluting the adsorbed proteins by means of an acid solution. This process gives excellent results as regards the selective extraction. However, it has scarcely been developed, since the treated whey immediately assumes a basic character, which then makes it unsuitable for animal consumption, except by means of costly subsequent treatment.

In the document FR-A-2,359,634 (known corresponding American document US-A-4,100,149), it has been proposed to bring the whey into contact with a cation exchange resin consisting of a porous inorganic support, of suitable particle size (spherical silica), coated with a film of crosslinked synthetic polymer bearing cation exchange groups represented by acidic groups, such as carboxylic, sulphonic or phosphonic acid groups. This system permits the recovery of metalloproteins, but in combination with a very high proportion of immunoglobulins (see, in particular, Example 3 of this Patent US-A-4,100,149, and Example 7 below). In addition, the extraction yield of metalloproteins is low, and the degree of purity of these proteins is considered to be insufficient from the economic standpoint unless, once again, subsequent, and hence costly, treatments are performed.

In the document FR-A-2,319,399 (known corresponding documents GB-A-1,544,867 and US-A-4,673,734), it has been recommended to extract proteins in general, which are known to number several thousand, by bringing them into contact with a porous inorganic support surface-coated with an aminated polysaccharide biopolymer. This system, which gives excellent results for the purification or separation of biological macromolecules such as gamma-globulins, haemoglobin and albumin, is invalid with whey, since the bulk of the proteins are then bound but the proteins having a cationic nature, such as the metalloproteins, are allowed to pass through. Consequently, this technique is not suitable for the selective separation of these metalloproteins from whey.

The present invention remedies these drawbacks. It relates to a process for the extraction of metalloproteins from whey, in particular those which bind iron, by adsorption on a solid support, followed by subsequent elution of the adsorbed proteins. It relates, more especially, to a process which is selective, economical and easy to carry out and, in particular, which enables the metalloproteins to be recovered in a truly selective and economical manner from whey without modification of the latter, that is to say while leaving it completely usable, in particular in animal feeding, both as a nutritional component and for providing energy, a situation which could not be achieved hitherto.

This process for the extraction of these metalloproteins from whey by adsorption on a porous inorganic support in the form of particles, followed by elution of the proteins thus adsorbed by means of solutions, is characterized in that the walls of the said particles are coated with a layer of aminated polysaccharide possessing acidic functional groups at the surface.

In the subsequent description and in the Claims, "aminated polysaccharides" denotes an aminated biopolymer having a cationic nature, such as dextran, starch, cellulose, argose and other -ose sugars. According to the invention, these biopolymers possess, in addition, acidic functional groups such as, in particular, carboxylic or sulphonic acid groups.

In other words, the invention comprises, for the specific extraction of metalloproteins from whey, which is known to contain hundreds of proteins, in having selected a porous inorganic support such as, for example, silica, the essential feature of which is, on the one hand, that it is coated no longer by a synthetic polymer but by a particular biopolymer, namely an aminated polysaccharide, whereas it was known (FR-A-2,319,399) that this type of biopolymer having a cationic nature was unsuitable for this extraction, and on the other hand, that it possesses acidic groups, whereas it was known in another context (FR-A-2,359,634) that these acidic groups led to mediocre selectivity from the industrial standpoint, on account of a yield and a purity that were considered to be insufficient.

Whereas the prior art discouraged the use of biopolymers, the invention comprises precisely in having found, completely unexpectedly, that the use of specific biopolymers, grafted in this instance with acidic groups, makes it possible not only to extract the metalloproteins selectively from whey but, in particular, to separate them well from the immunoglobulins and lastly to operate with a yield and a degree of purity which are markedly improved and under conditions that are compatible with an industrial process. This selection is especially surprising in view of the fact that nothing in the state of the art gave the specialist the idea of combining the teachings concerning a material having a cationic nature with another material having an anionic nature, these features being inherently contradictory.

It is all the more surprising that this success can be obtained by coating porous particles of silica by means of a polysaccharide grafted with acidic groups, a selectivity of this kind being obtained, whereas it was known that this type of cation exchange resin possessing acidic groups was prohibited (see document cited above, FR-A-2,359,634, page 1, lines 17 et seq.) as a cation exchange resin for proteins (preconceived idea of a technical nature overcome).

Thus, the invention resides in a particular selection for a precise selectivity within a broad family, whereas the prior art discouraged a selection of this kind which enables a problem to be solved advantageously and economically while reducing manufacturing costs and increasing productivity.

Altogether unexpectedly, the Applicants have found that the choice of these specific porous inorganic particles makes it possible:

on the one hand, to improve the extraction yield considerably (twice as high);

on the other hand and especially, to extract the desired metalloproteins specifically, selectively and with ease from whey, without them being mixed with other proteins, this being achieved with a yield and a degree of purity that are very markedly improved (economies in time and means and gain in productivity); and lastly, not to affect the treated whey, which thus remains fully suitable for consumption and retains all its nutritional value.

This selection makes it possible, in addition, to work under pH conditions close to neutrality, in particular under conditions which enable the said metalloproteins to be collected selectively and economically in soluble form.

It might be thought that the selection of the invention is a mixture of prior teachings. On the one hand, these teachings contradict one another, and on the other hand, and especially, it is known that a chemical product is not a mixture of its different constituents.

Advantageously, in practice:

the polysaccharide coating the walls of the inorganic particles is dextran or a dextran derivative, such as an aminated derivative;

preferably, compounds of the diethylaminoethyldextran (DEAE) type, having a molecular weight of at least $10^4$ and preferably $10^5$ to $10^6$ daltons, are employed;

the acidic groups are carboxylic or sulphonic acid groups; advantageously, these acidic groups are bound to the saccharide biopolymer via divalent hydrocarbon radicals, in particular via alkylene groups such as methylene or propylene;

the porous inorganic particles are advantageously of inorganic oxides such as, preferably, spherical silica particles obtained, in particular, pyrogenically;

the silica particles are spherical particles whose:

particle size is between ten and one thousand micrometers, and preferably between one hundred and three hundred micrometers;

specific surface area is between one and four hundred $m^2/g$ and preferably between fifteen and two hundred $m^2/g$;

mean pore diameter is between five and two hundred nm;

in a variant, the whey is first treated by a first passage through silica particles of a first category of the type in question containing acidic groups that are weak cation exchangers, such as, in particular, carboxyl groups, this being done in order to retain the lactoferrin, and then, in a second stage, the whey thus treated passes in series through particles of a second category comprising acidic groups that are strong cation exchangers, such as, in particular, sulphonic acid groups, this being done in order to retain the lactoperoxidase; and the whey is a sweet whey, that is to say whose pH is between 6.3 and 6.6; in a variant, it is possible to employ an acid whey, that is to say a whey whose pH is between 4.3 and 4.6.

The manner in which the invention may be carried out, and the advantages resulting therefrom, will become more apparent from the examples of embodiment which follow, these being given as a guide and without implied limitation, with the aid of the attached single figure, which is a concise schematic representation of an installation suitable for carrying out the process according to the invention.

EXAMPLE 1

Four hundred litres of sweet whey (2) from cheesemaking (pH 6.4) are introduced into a reservoir (1) and stirred slowly in order to keep it homogeneous. This whey is cooled in a known manner to a temperature of between 3° and 8° C. This whey (2) contains approximately 74.6 mg of lactoferrin and 50.5 mg of lactoperoxidase per litre.

Twenty litres of a first solution (4), containing approximately three grams per litre (g/l) of sodium chloride (neutral pH) are introduced into a reservoir (3).

Four kilos of spherical particles of porous silica (6), marketed by IBF-Biotechnics under the registered trademark "CM-SPHERODEX-LS", having a particle size of between 100 and 300 microns, a pore diameter in the region of 100 nm, a specific surface area of approximately 25 $m^2/g$, and pores whose walls are coated with a continuous fine layer of DEAE-dextran grafted with carboxylic acid groups, are placed in the column (5).

In a first stage, the whey (2) is initially allowed to flow from the reservoir (1) onto the silica (6) in the course of four hours thirty minutes:

The treated whey (7) is recovered in a reservoir (8) and is then conveyed at (9) to be concentrated and dried in the usual manner. This whey, whose pH has not been modified, still contains most of the proteins. Accordingly, it may be used without further treatment in animal feeding as a contribution to nutritional requirements.

When the whey (2) has passed through the silica (6) the valve (10) is turned so as to transfer to the adsorbed column, designated by the reference (11), the twenty litres of the first washing solution (4) at neutral pH.

The silica (6) has adsorbed the desired metalloproteins of the whey (2).

When the washing solution (4) has passed through, a second saline solution (12) of fifteen litres, containing thirteen grams per litre of sodium chloride, is introduced into the reservoir (3).

This second solution (12) is allowed to flow freely onto the adsorbed column (11). Via the valve (13), the washing liquid is recovered in the tank (14). The adsorbed silica (6, 11) is then washed by means of a third solution (32) of fourteen litres of a saline solution containing 45 g/l of sodium chloride, which is transferred from the reservoir (3) and recovered in a separate tank (15).

The contents of the tank (14) are transferred to another tank (20), and then from there to an ultrafiltration apparatus (21), where dialysis water (31) is injected in order to decrease the mineral content. The contents are passed over organic membranes (33) having a pore diameter corresponding to $10^4$ daltons, at a temperature of between 12 and 50° C.

The contents of the tank (15) are then transferred to the tank (20), and the same procedure is followed.

The permeates obtained are recovered at (34), in particular for re-use in other elutions.

The retentates (22) are recovered at outflow from the ultrafiltration apparatus (21). By means of a valve (23), these retentates (22) may be transferred:

either to a lyophilization apparatus (24) where the desired metalloproteins are recovered en masse;

or to a drying tower (35), where they are also recovered en masse;

or, preferably, to an apparatus for fractionation by ion exchange chromatography (25) on an organic gel of the type marketed by IBF BIOTECHNIX under the registered trademark "SP-TRISACRYL LS", to be fractionated into each of the two desired proteins, lactoferrin (26) and lactoperoxidase (27), respectively.

The silica (6) is then washed with water (29) transferred from the reservoir (3). This washing is followed by another acid wash (N/10 solution of hydrochloric acid). The silica (6) is finally regenerated by a percolation of twenty litres of sodium acetate solution at pH 5.5.

Thus, for four hundred litres of whey (2) used at the start, the following are obtained:

on the one hand, almost four hundred litres of whey extract (9), capable of being used directly in animal feeding and having all its nutritional value; and on the other hand:

23.6 grams of lactoferrin, equivalent to a degree of extraction of 79%, with a degree of purity with respect to the other proteins present in this solution of at least 80%;

2.8 grams of lactoperoxidase, equivalent to a degree of extraction of 14%, with a degree of purity of more than 50%.

EXAMPLE 2:

Example 1 is repeated, injecting in the dialysis water (31) an aqueous solution containing two grams per litre (2 g/l) of iron ammonium sulphate stabilized with ascorbic acid. The desired proteins are thus saturated with iron, which increases their nutritional efficacy.

EXAMPLE 3:

Example 1 is repeated with the variants below.

In the first place, the silica (6) is replaced by the same quantity of particles of porous silica marketed under the name SP-SPHERODEX-LS (registered trademark), whose walls are coated with a layer of DEAE-dextran grafted with sulphopropyl groups and whose physical properties are similar to those of the particles of Example 1.

306 litres of a sweet whey for cheese-making, pH 6.4, containing 46.2 mg/l of lactoferrin and 44.7 mg/l of lactoperoxidase, are treated. The flow rate is adjusted to one hundred litres/hour. Seventeen litres of a first solution (4) containing three grams/litre of sodium chloride are introduced into the reservoir (3).

The eluent (12) consists of twenty eight litres of a saline solution containing 15 g/l of sodium chloride, and permits the recovery at (14) of 1.23 g of lactoferrin and 0.6 g lactoperoxidase.

The second eluent (32) consists of twenty seven litres containing 45 g/l of sodium chloride, and permits the recovery at (15) of 2.7 g of lactoferrin and 5.1 g of lactoperoxidase.

Finally, the column is treated with another eluent (30) consisting of twenty-one litres containing 60 g/l of sodium chloride. 4.0 g of lactoferrin are obtained.

Thus, it has been possible to recover: 7.93 g of lactoferrin (yield: 57%), 5.7 g of lactoperoxidase (yield: 42%).

EXAMPLE 4:

Example 1 is repeated, replacing the sweet whey for cheese-making by 198 litres of acid whey of casein production, pH 4.5, containing 84.0 mg/l of lactoferrin and 37.0 mg/l of lactoperoxidase.

The flow rate of the passage of the whey over the silica particles containing carboxyl groups is adjusted to one hundred litres/hour.

As before, the column is washed with twenty litres of a solution (4) containing 3 g/l of sodium chloride.

The first elution (12) is performed by means of a solution of twenty litres containing 15 g/l of sodium chloride. 2.08 g of lactoferrin and 1.6 g of lactoerpoxidase are obtained.

The second eluation (32) is performed by means of a solution of thirty one litres containing 45 g/l of sodium chloride. 3.7 g of lactoferrin are obtained.

Thus, the following are recovered:

5.78 g of lactoferrin (35% yield), 1.6 g of lactoperoxidase (22% yield).

EXAMPLE 5

Example 3 is repeated with 180 litres of acid whey of casein production (pH 4.5) containing 87 mg/l of lactoferrin and 33 mg/l of lactoperoxidase.

The saline washing solution (4) comprises twelve litres containing 3 g/l of sodium chloride.

The first elution (12) is performed by means of a solution of thirty eight litres containing 15 g/l of sodium chloride. 1.3 g of lactoferrin and 0.16 g of lactoperoxidase are obtained.

The second elution (32) is performed by means of twenty eight litres of a solution containing 45 g/l of sodium chloride. 3.0 g of lactoferrin and 3.9 g of lactoperoxidase are obtained.

The following are thus recovered:

4.3 g of lactoferrin (yield: 27%), 4.06 g of lactoperoxidase (yield: 69%).

EXAMPLE 6

This example illustrates a treatment according to the invention, performed by passing the same whey through two columns in series, each containing a different type of silica particles whose walls are coated with a layer of aminated polysaccharide.

250 litres of a sweet whey from cheese-making, containing 81.5 mg/l of lactoferrin and 52.0 mg/l of lactoperoxidase, are percolated in the course of two and a half hours through a first column containing four kilos of CM SPHERODEX LS silica particles identical to those of Example 1 (carboxyl groups).

The whey thus treated is stored in a suitable reservoir, and the silica (6, 11) is then washed with fifteen litres of an aqueous solution (4) containing 3 g/l of sodium chloride.

Elution is then performed, in the first place with a first solution (12) of fifteen litres containing 13 g/l of sodium chloride, and a solution containing 1.87 g of lactoperoxidase and 0.85 g of lactoferrin is collected, and then by means of a second elution (32) of sixteen litres containing 45 g/l of sodium chloride, which then enables 19.0 g of lactoferrin to be collected.

The following were hence collected in this way
19.85 g of lactoferrin (yield: 98%)
1.87 g of lactoperoxidase (yield: 14%).

The 250 litres of stored whey, already treated, are then percolated through a second column containing 2.5 kilos of SP SPHERODEX LS particles (sulphopropyl groups) identical to the particles of Example 3, with a flow rate of 100 litres/hour.

This whey, which now contains virtually no lactoferrin, still contains 42.1 mg/l of lactoperoxidase.

After percolation, the column is washed with a solution of 20.5 litres of sodium chloride containing 3 g/l.

The column is then eluted with thirty seven litres of sodium chloride solution containing 15 g/l, and 1.7 g of lactoperoxidase are obtained.

The column is then eluted with a solution of eighteen litres containing 45 g/l of sodium chloride, and 9.3 g of lactoperoxidase are obtained.

Eleven grams (11 g) of lactoperoxidase, equivalent to virtually the total quantity present in the initial whey (11+1.87=12.87, for 13 g/l) have hence been obtained by this second treatment.

In other words, the two successive operations of percolation of whey through two different types of silica particles hence permit the extraction of virtually the total quantity of lactoferrin and lactoperoxidase present in the initial whey.

EXAMPLE 7

Example 1 is repeated, replacing the "CM-SPHERODEX-LS" silica by a "hydrophilic" porous silica having the same physical properties as in Example 1. This hydrophilic porous silica is coated with a synthetic acrylic polymer grafted with carboxymethyl acidic groups, according to the teachings of the document FR-A-2,359,634 cited in the preamble.

Three hundred litres of sweet whey (pH 6.4), containing 50.2 mg/l of lactoferrin and 33.8 mg/l of lactoperoxidase, are passed through 2.5 kilos of this silica with a flow rate of 75 litres/hour.

After elutions, the following are obtained: on the one hand, three hundred litres of whey (9) which is usable as a nutritional component for cattle; and on the other hand:
- one hundred and twenty grams of various proteins chiefly containing immunoglobulins,
- 7.1 g of lactoferrin (yield: 47%, compared with 79% in Example 1), with a degree of purity of less than 40% compared with 80%,
- 0.9 g of lactoperoxidase (yield: 9% compared with 14.9%), with a degree of purity of less than 30% compared with 50% in Example 1.

Consequently, this lactoferrin and this lactoperoxidase are essentially mixed with a very high proportion of immunoglobulins, from which they have to be separated.

In other words, not only is the yield of this prior art markedly lower with respect to metalloproteins, but the degree of purity of these metalloproteins is also lower, and this then necessitates subsequent purification operations.

EXAMPLE 8:

Example 1 is repeated with a porous silica identical to that employed in Example 1, but coated with a film of diethylaminoethyldextran (DEAE), marketed by IBF-BIOTECHNICS under the name DEAE SPHERODEX-LS (teachings of Patent US-A-4,673,734).

The bulk of the proteins of whey are then bound, with the exception of the desired lactoferrin and lactoperoxidase, which are carried over with the whey (9).

The last two Examples illustrate perfectly the surprising effect of the selection according to the invention.

The use of silica coated with an aminated but not grafted biopolymer does not give the desired results, namely the specific extraction of lactoferrin and lactoperoxidase.

The use of these same spherical silica particles, but coated with a synthetic polymer possessing acidic functional groups, enables the metalloproteins to be collected, but combined with other proteins and with a yield and a degree of purity that are plainly insufficient (see Example 7 above).

The process for the extraction of lactoferrin and lactoperoxidase according to the invention differs from the processes proposed hitherto essentially by:
- the selective extraction of these two proteins, which are in demand but were hitherto difficult to extract because they are present in too small amounts and mixed with other proteins;
- the ease of implementation;
- the particularly high extraction yield (almost twice as high as the yields of the prior art; see, in particular Examples 7 and 8); and
- the high purity of the extracted metalloproteins, no doubt due to the greater specificity of extraction.

The metalloproteins recovered in this manner, namely, in particular those which bind iron, such as lactoferrin and lactoperoxidase, may be used successfully in applications which are known at the present time, such as, for example:
- in animal nutrition, for the protection of the digestive tract and the role of growth factor;
- in the veterinary field, for intestinal anti-infectious activity and activity at mammary level;
- in the field of dietetics and human nutrition, in particular as a carrier of iron; and
- in the pharmaceutical field: ophthalmology, gastroenterology, paradontology, dermatology, gynaecology, etc.

We claim:

1. A process for the selective extraction of only metalloproteins selected from the group consisting of lactoferrin and lactoperoxydase from whey, by adsorption on a porous inorganic support in the form of solid particles, followed by elution of the metalloproteins thus adsorbed by means of solutions, wherein the walls of the said particles are coated with a layer of diethylaminoethyldextran having a carboxylic or sulphonic acid groups.

2. The process of claim 1, wherein the acidic groups are bound to the saccharide biopolymer via divalent hydrocarbon radicals.

3. The process of claim 2, wherein the divalent hydrocarbon radicals are alkylene groups.

4. The process of claim 1, wherein the porous inorganic particles are spherical silica particles whose:
- particle size is between ten and one thousand micrometers;
- specific surface area is between one and four hundred $m_2/g$; and
- means pore diameter is between five and two hundred nanometers.

5. The process of claim 1 wherein the whey is first treated by passage through silica particles whose walls are coated with a layer of diethylaminothyldextran having carboxyl groups at the surface, and then the thus treated whey passes in series through silica particles whose walls are coated with another layer of diethylaminothyldextran having sulphonic acid groups at the surface.

6. The process of claim 1, wherein the whey is a sweet whey.

* * * * *